United States Patent [19]
Lequime

[11] Patent Number: 5,184,010
[45] Date of Patent: Feb. 2, 1993

[54] SPECTRUM MODULATION ENCODING SENSOR SYSTEM FOR REMOTELY DETECTING A PHYSICAL MAGNITUDE, AND OPERATING BY REFLECTION

[75] Inventor: Michel Lequime, Eguilles, France

[73] Assignee: Bertin & Cie, Plaisir, France

[21] Appl. No.: 752,699

[22] PCT Filed: Jan. 11, 1991

[86] PCT No.: PCT/FR91/00015
§ 371 Date: Sep. 5, 1991
§ 102(e) Date: Sep. 5, 1991

[87] PCT Pub. No.: WO91/10880
PCT Pub. Date: Jul. 25, 1991

[30] Foreign Application Priority Data
Jan. 12, 1990 [FR] France .................. 90 00317

[51] Int. Cl.$^5$ .............................................. H01J 5/16
[52] U.S. Cl. ........................ 250/227.21; 250/231.19
[58] Field of Search .................... 250/227.21, 227.14, 250/227.17, 231.19, 225; 324/96, 244.1; 385/12

[56] References Cited

U.S. PATENT DOCUMENTS

| | | | |
|---|---|---|---|
| 4,547,774 | 10/1985 | Gould | 250/263 |
| 4,762,397 | 8/1988 | Pepper | 359/71 |
| 4,950,884 | 8/1990 | Banks | 250/227.21 |
| 5,038,359 | 8/1991 | Pepper et al. | 359/529 |
| 5,061,846 | 10/1991 | Gergely | 250/227.14 |

FOREIGN PATENT DOCUMENTS

| | | |
|---|---|---|
| 130337 | 1/1985 | European Pat. Off. . |
| 3020454 | 12/1980 | Fed. Rep. of Germany . |
| WO88/04065 | 6/1988 | PCT Int'l Appl. . |

OTHER PUBLICATIONS

Patent Abstracts of Japan, vol. 7, No. 212 (P-224) [1357], Sep. 20, 1983; JP-A-58 106 413 (Fujikura Densen K.K.).

Primary Examiner—David C. Nelms
Assistant Examiner—John R. Lee
Attorney, Agent, or Firm—Bell, Seltzer, Park & Gibson

[57] ABSTRACT

The invention relates to an optical sensor using spectrum modulation encoding and operating by reflection, the sensor is connected by an optical fiber (10) to a light source and to a demodulator, and it comprises a collimator lens (16), a first polarizer (18), a sensitive component (20) subjected to the physical magnitude to be measured, a second polarizer (32), and catadioptric reflection means (28) such as a corner of a cube. The sensor of the invention enables all of the light flux to be reinserted into the optical fiber (10) after passing through the sensor without any disturbance from interference phenomena.

11 Claims, 1 Drawing Sheet

SPECTRUM MODULATION ENCODING SENSOR SYSTEM FOR REMOTELY DETECTING A PHYSICAL MAGNITUDE, AND OPERATING BY REFLECTION

BACKGROUND OF THE INVENTION

The invention relates to a system for remotely detecting a physical magnitude and of the type that operates by reflection, the system comprising an incoherent light source connected by an optical fiber to a sensor having a birefringent sensitive component subjected to the magnitude to be measured and within which light is subject to periodic modulation of its spectrum.

Such sensors are already known (the Applicants' French patent 2 595 820) and are used for remotely measuring physical magnitudes such as temperature, magnetic field, position, displacement, etc. . . . .

With these sensors, the end of the optical fiber is placed at the focus of a collimator lens whose optical axis looks into the sensitive component. When the sensor is of the type that operates in transmission, the sensitive component is preceded by a polarizer and is followed by an analyzer, and a second collimation lens connects it to an optical fiber leading to apparatus for analyzing the spectrum of the light.

When the sensor operates by reflection, the sensitive component is still preceded by a polarizer, but it is followed by a mirror that reflects the received light flux and causes it to pass back through the sensitive component, the polarizer, and the collimator lens to send it back into the optical fiber towards a spectrum analysis apparatus connected to said fiber by a Y-coupler.

Because of the very small size of the core of the optical fiber, the reflecting mirror must be disposed perpendicularly to the optical axis of the system with a very high degree of precision to ensure that a maximum amount of light flux is returned to the optical fiber. For example, if it is desired to obtain a reinsertion loss of the light into the optical fiber, of less than 1 dB, then the angle between the perpendicular to the mirror and the optical axis of the system must be less than three minutes of angle for an optical fiber having a core diameter of about 0.1 mm and for a collimator lens having a focal length of 10 mm.

Such accuracy in mirror positioning is difficult to achieve and to conserve over time.

To avoid this drawback, conventional solutions consist in increasing the diameter of the optical fiber core or in reducing the focal length of the collimator optics. Nevertheless, it is difficult to reduce the focal length below 1 mm, or to use optical fiber having a core diameter that is greater than 0.2 mm. In addition, this results in a collimated light beam with very high divergence and that also gives rise to a loss of light flux that is significant when the collimator lens to mirror distance becomes large relative to the focal length.

Another conventional solution consists in defocusing the optical fiber relative to the collimator lens. This nevertheless gives rise to large loss when the light flux is reinserted into the optical fiber, which loss is a function of the defocusing and may be about 5 dB to 10 dB.

An object of the invention is to provide a solution to this problem which is simple, effective, and reliable, while guaranteeing minimum reinsertion loss.

Another object of the invention is to increase the performance of a sensor of the above-mentioned type.

SUMMARY OF THE INVENTION

To this end, the invention provides a system for remotely detecting a physical magnitude and operating by reflection, the system making use of the principle of encoding light by spectrum modulation, and comprising a source of incoherent light connected by an optical fiber to a sensor having a sensitive component subjected to the measured magnitude and in which light is subject to periodic modulation of its spectrum, a collimator lens and a polarizer being disposed between the optical fiber and the sensitive component of the sensor, and optical reflection means are provided at the opposite end of the sensor, the system being characterized in that the optical reflection means is of the catadioptric type in which the direction of reflection is parallel to the direction of incidence, and in that a second polarizer is placed between the sensor and the reflection means, the light-passing directions of the two polarizers being preferably crossed or parallel, and oriented at 45° to the neutral axes of the sensitive component of the sensor.

The use of a catadioptric reflector makes it possible to reinsert a maximum amount of light flux into the optical fiber. However, the total reflection of the light flux on the faces of the catadioptric component gives rise to an interfering disturbance in the periodic modulation induced by the sensor in the spectrum of the light flux emitted by the source, and this disturbance is difficult to calibrate. The presence of the second polarizer interposed between the reflector and the sensitive component serves to isolate the reflector from the interference phenomenon that arises in the sensitive component and to put the spectral transmittances associated with the goand-return passes through the sensitive component into series without significant additional loss.

The useful modulation amplitude of the light flux is not significantly altered compared with that obtained in a conventional sensor operating in transmission, and the continuous wave (CW) background of the signal is reduced, which is equivalent to obtaining a greater modulation index at the working frequency. The visibility of the modulation at the working frequency is thus improved. In addition, reinserting the light flux into the optical fiber does not give rise to problems and may easily be obtained and conserved over time.

In a first embodiment of the invention, the optical reflection means is constituted by a corner of a cube with the apex thereof being situated on the optical axis of the sensor, with the apex pointing away from the sensor.

The faces of the corner of a cube are oriented relative to the second polarizer in such a manner as to obtain maximum light flux after the second passage through the second polarizer.

In a variant, the reflection means may be a P/4 type or a 3P/4 type Selfoc lens having a metallized rear face.

In a preferred embodiment of the invention, the collimator lens (of the "Selfoc" type), both polarizers, the sensor, and the optical reflection means are all housed coaxially in the same cylindrical sheath or housing made of metal or of dielectric material, and which may be constituted by a capillary tube, for example.

A sensor is thus obtained which is very simple, very easy to handle, very small (having an outside diameter of about 2 mm to 4 mm, depending on the embodiment), and easy to build.

BRIEF DESCRIPTION OF THE DRAWINGS

The invention will be better understood, and other details, characteristics, and advantages thereof will appear more clearly on reading the following description given by way of example and made with reference to the accompanying drawing, in which.

DESCRIPTION OF THE ILLUSTRATED EMBODIMENTS

Figure 1:
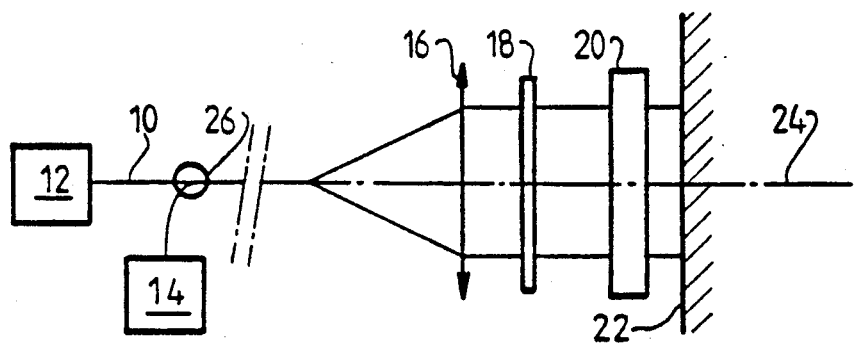
FIG. 1 is a diagram of a prior art reflection sensor.

Reference is made initially to FIG. 1 which is a diagram of a prior art sensor operating by reflection and comprising a multimode optical fiber 10 mounted between a source 12 of incoherent light and a sensor comprising a collimator lens 16, a polarizer 18, a birefringent crystal 20 subjected to the magnitude being measured (e.g. temperature), and a totally reflecting plane mirror 22 which is oriented perpendicularly to the optical axis 24 of the system.

A Y-coupler 26 connects the optical fiber 10 to an apparatus 14 for analyzing the spectrum of light (e.g. a demodulator interferometer).

This type of sensor operates as follows:

The light emitted by the source 12 is transmitted by the optical fiber 10 to the sensor, is polarized linearly on passing through the polarizer 18, and is transmitted to the crystal 20 while polarized in a plane which is inclined relative to the slow and fast axes of the crystal 20. This inclination is preferably 45°. On passing through the crystal, the light flux splits into two waves that are polarized in two perpendicular planes and that propagate at different velocities, such that these two waves are phase shifted in time on leaving the crystal. The light flux leaving the crystal is reflected by the mirror 22, passes back through the crystal 20 and then the polarizer 18, and is reinserted into the optical fiber 10 by the collimator lens 16. This light flux is finally transmitted to the spectrum analysis apparatus 14.

On leaving the sensor, the spectral distribution of the light flux is modulated at a frequency which is a function of the path length difference within the sensor, and this difference varies as a function of the physical magnitude to which the crystal 20 is sensitive.

By measuring this path length difference, it is thus possible, after initial calibration, to determine the value of the physical magnitude acting on the crystal 20.

However, and as mentioned above, it is necessary for the mirror 22 to be oriented perpendicularly to the optical axis 24 with very great accuracy, since any error gives rise to a very significant reduction in the light flux transmitted to the spectrum analysis apparatus 14.

If the focal length of the lens 16 is written f, the radius of the core of the optical fiber is written r, and the angle between the optical axis 24 and the perpendicular to the mirror 22 is written a, then the efficiency with which the light flux is reinserted into the optical fiber 10 after being reflected on the mirror 22 is given by the following equation:

$$T = (2/\pi)(\theta - \cos\theta \cdot \sin\theta), \text{ where } r \cdot \cos\theta = f \cdot a$$

If the focal length f is 10 mm and if the radius of the optical fiber core is 0.05 mm, then reinsertion loss of less than 1 dB requires an angle a of less than 3 minutes of angle.

This accuracy is very difficult to obtain and to conserve over time, and an error in the orientation of the mirror relative to the optical axis of the system can give rise to a loss of information at the spectral analysis apparatus 14.

Figure 2:
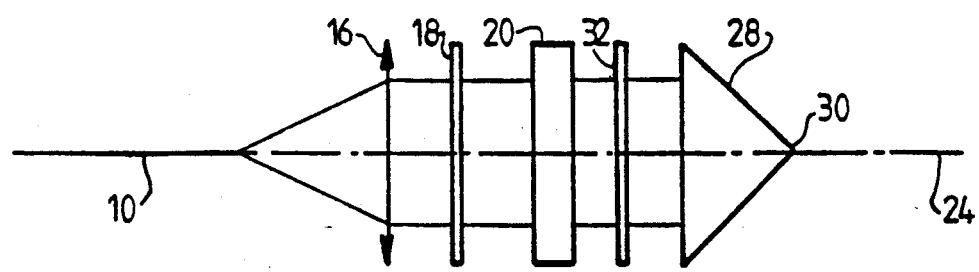
FIG. 2 is a diagram of a reflection sensor of the invention.

The system of the invention as shown diagrammatically in FIG. 2 serves to avoid these drawbacks.

As before, at the end of the optical fiber 10, this system has a sensor comprising the collimator lens 16, the polarizer 18, and the birefringent crystal 20 which is sensitive to the physical magnitude to be measured, all of which are the same as in the sensor of FIG. 1.

According to the invention, the mirror 22 is replaced by a catadioptric reflector in which the direction in which light is reflected is always parallel to the incident direction.

In the embodiment of FIG. 2, this reflector is constituted by a corner of a totally reflecting cube 28, whose apex 30 lies on the optical axis 24 of the system and points away from the sensor. In addition, a second polarizer 32 is interposed between the crystal 20 and the reflector 28, said second polarizer having a light-passing direction which is parallel or perpendicular to that of the first polarizer 18 and is thus preferably oriented at 45° to the slow and fast axes of the crystal 20.

The orientation of the faces of the corner of a cube 28 relative to the second polarizer 32 is determined so that the light flux transmitted after reflection on the corner of a cube 28 and passing through the second polarizer 32 is at a maximum (minimum phase shift on reflection).

This system operates as follows:

The optical fiber 10 delivers non-polarized light flux having a spectrum distribution $P_0(\sigma)$.

After passing through the first polarizer 18 this flux becomes $(\frac{1}{2})P_0(\sigma)$.

After passing through the crystal 20 and the second polarizer 32, the spectrum distribution of the polarized flux is as follows:

$$P_1(\sigma) = (\tfrac{1}{4})P_0(\sigma)[1 + \cos 2\pi\sigma\Delta], \text{ where } \Delta = e(n_e - n_o)$$

where e designates the thickness of the crystal 20, and $n_e$ and $n_o$ are the refractive indices of the crystal 20 respectively along its fast axis and along its slow axis.

The light flux passing through the corner of a cube 28 and reflected on the faces thereof is elliptically polarized, with the orientation and the ellipticity of this polarization being substantially independent of wavelength.

The second pass through the polarizer 32 gives rise to said elliptical polarization state being projected on the light-passing direction of the polarizer 32, thus giving rise to a spectrum distribution of the following type:

$$P'_1(\sigma) = (\tfrac{1}{4})P_0(\sigma)\cos^2\delta[1 + \cos 2\pi\sigma\Delta]$$

where $\delta$ is small and independent of wavelength. An appropriate orientation of the corner of a cube 28 relative to the second polarizer 32 serves to obtain a value of $\cos\delta$ that is close to one.

After passing a second time through the sensor 20, the following final light flux distribution is obtained:

$$\begin{aligned}P_2(\sigma) &= (1/8)P_0(\sigma)\cos^2\delta[1 + \cos 2\pi\sigma\Delta]^2 \\ &= (3/16)\cos^2\delta P_0(\sigma)[1 + (4/3)\cos 2\pi\sigma\Delta + (1/3)\cos 4\pi\sigma\Delta]\end{aligned}$$

By way of comparison, the following distribution would be obtained at the output from the sensor of FIG. 1:

$$P_2(\sigma) = (\tfrac{1}{4})P_0(\sigma)[1 + \cos 4\pi\sigma\Delta]$$

This light flux can then be directed to a demodulation interferometer having a path length difference $\Delta 0$ close to $\Delta$, thus making it possible to obtain a signal S given by the following equation:

$$S = (3/32)\cos^2\delta \bar{P}_0(\Delta - \Delta 0)[1 + (\tfrac{2}{3})\cos 2\pi\sigma_0(\Delta - \alpha 0)]$$

in which $\bar{P}_0$ designates the Fourier transform of $P_0$, and $\sigma_0$ designates the center wavelength of the light source.

With a sensor such as that shown in FIG. 1, and a demodulator interferometer tuned on the frequency $2\Delta$, the following signal S' would be obtained:

$$S' = (\tfrac{1}{8})\bar{P}_0(2\Delta - \Delta 0)[1 + (\tfrac{1}{2})\cos 2\pi\sigma_0(2\Delta - \Delta 0)]$$

A comparison between the signals S and S' shows that:

1) The system of the invention provides a useful modulation amplitude equal to:

$$(1/16)\bar{P}(\Delta - \Delta 0)\cos^2\delta \cdot \cos 2\pi\sigma_0(\Delta - \Delta 0)$$

This useful modulation amplitude is identical to that obtained with the system of FIG. 1 when the mirror 22 is exactly perpendicular to the optical axis 24 (assuming that $\cos^2\delta = 1$), which means that the system of the invention does not give rise to a loss of useful light flux on reinsertion into the optical fiber 10.

2) The CW background of the signal is smaller, which corresponds to a higher modulation index at the working frequency ($\tfrac{2}{3}$ instead of $\tfrac{1}{2}$) such that better visibility of the interference phenomenon is obtained.

3) The demodulator interferometer 14 includes a crystal of the same thickness as the crystal constituting the sensitive component 20, given that the working frequency is centered on $\Delta$ (and not on $2\Delta$), since the detection interferometer usually operates on a single pass of the light flux.

4) The constraints on positioning the optical reflection means accurately are eliminated, and the only alignment that is required is the alignment of the apex 30 of the corner of a cube 28 which must lie on the optical axis 24, however this adjustment is not critical, nor is the orientation of the faces of the corner of a cube.

5) Additional detection may be performed at the frequency $2\Delta$, thereby making it possible using conventional multiplexing techniques to obtain two items of information (two tuning crystals are used in the detection interferometer, one centered on $\Delta$ and the other on $2\Delta$). By measuring two items of information simultaneously in this way, it is possible to confirm the signal phase determination and to obtain integrated permanent recalibration means for the detector system (in particular for compensating possible drift in the source wavelength).

The corner of a cube 28 may be replaced by any other catadioptric type reflector component in which the direction of reflected light rays is always parallel to the direction of incident light rays. For example, it would be possible to use a P/4 or a 3P/4 type Selfoc lens with a metallized rear face, or a converging lens and a plane mirror situated in its focal plane.

It would also be possible to use a "hollow" corner of a cube, i.e. made up of three faces that are plane and mutually perpendicular, and which are reflective or internally metallized, or else a solid corner of a cube where the three perpendicular faces are externally metallized.

Figure 3:
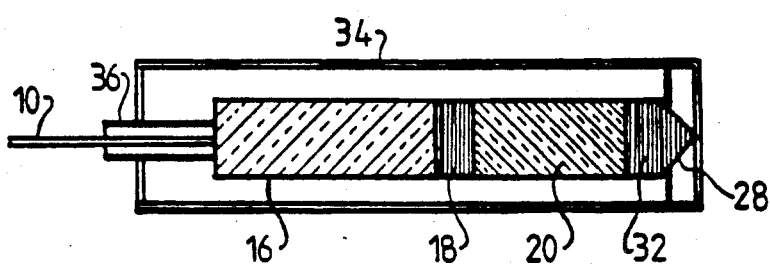
FIGS. 3 and 4 are diagrammatic axial section views through two possible embodiments of the invention.
Figure 4:
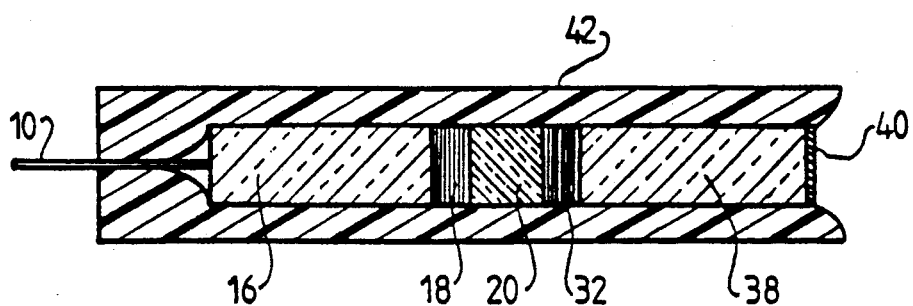

FIGS. 3 and 4 show two practical embodiments of the system of the invention given by way of example.

In FIG. 3, the system comprises a cylindrical metal housing 34 containing collimator optics 16 constituted by a Selfoc lens, the two polarizers 18 and 32, the corner of a cube 28, and a quartz crystal 20 constituting the sensitive component of the sensor. The optical fiber 10 is mounted in a ferrule 36 where it passes through one end of the housing 34. The length of the housing may be about 30 mm to 40 mm, and its diameter may be 4 mm.

In FIG. 4, a Selfoc lens 16 forming the collimator optics, the two polarizers 18 and 32, the sensitive component 20 made of calcite, and a Selfoc lens 38 having a metallized rear face 40 are all mounted inside a glass capillary tube 42. The diameter of the system is slightly less than 2 mm and it is about 10 mm long.

In order to reduce the CW component on demodulation, the invention also provides for depositing a single layer or a multilayer antireflection treatment on the optical fiber.

In general, the invention serves to solve the problems of assembling and installing spectrum modulation encoding sensors operating by reflection without significant loss of light flux, and to make use of such sensors for measurements at a distance in an aggressive medium (vibration, shock, expansion) without fear of performance being degraded by misalignment or by defocusing.

I claim:

1. A system for remotely detecting a physical magnitude and operating by reflection, the system making use of the principle of encoding light by spectrum modulation, and comprising a source of incoherent light connected by an optical fiber to a sensor which has an optical axis and which comprises, successively on said optical axis, a collimator lens, a first polarizer, a birefringent sensitive component subjected to the physical magnitude to be measured, a second polarizer and a catadioptric reflection means, said catadioptric reflection means reflecting the light in a direction parallel to the direction of the incident light, the birefringent sensitive component having slow and fast axes, and the first and second polarizer having light-passing directions which are inclined relative to the said slow and fast axes of the birefringent sensitive component.

2. A system according to claim 1, wherein the light-passing directions of the first and second polarizers are oriented at 45° to the slow and fast axes of the sensitive component.

3. A system according to claim 2, wherein the reflection means is constituted by a corner of a cube having an apex situated on the optical axis of the sensor, with the apex pointing away from the sensor.

4. A system according to claim 3, wherein the faces of the corner of said cube are oriented relative to the second polarizer in such a manner as to obtain maximum light flux after the reflected light passes through the second polarizer.

5. A system according to claim 2, wherein the reflection means is a corner of a hollow cube formed by three faces that are reflective or are internally metallized, or by a corner of a solid cube whose three perpendicular faces are externally metallized.

6. A system according to claim 2, wherein the reflection means is constituted by a converging lens and a plane mirror situated in the focal plane thereof.

7. A system according to claim 2, wherein the reflection means is a P/4 type or a 3P/4 type Selfoc lens having a metallized rear face.

8. A system according to claim 2, wherein the optical fiber includes a single layer or a multilayer antireflection coating.

9. A system according to claim 2, wherein the collimator lens, the polarizers, the sensitive component, and the reflection means are all housed in a metal housing or a cylindrical sheath made of dielectric material.

10. A system according to claim 2, further comprising a demodulator interferometer tuned to a modulation frequency generated by the sensor and to twice this frequency so as to eliminate possible drift in a central wavelength of the source.

11. A system according to claim 2, wherein the light-passing directions of the first and second polarizers are perpendicular or parallel.

* * * * *

UNITED STATES PATENT AND TRADEMARK OFFICE
CERTIFICATE OF CORRECTION

PATENT NO. : 5,184,010

DATED : February 2, 1993

INVENTOR(S) : Michel Lequime

It is certified that error appears in the above-identified patent and that said Letters Patent is hereby corrected as shown below:

Column 2, line 35, "goand-return" should be
-- go-and-return --.

Column 5, line 11, the formula:
"$S=(3/32)\cos^2\delta \bar{P}_0(\Delta-\Delta 0)[1+(2/3)\cos 2\pi\sigma_0(\Delta-\alpha 0)]$" should be -- $S=(3/32)\cos^2\delta \bar{P}_0(\Delta-\Delta 0)[1+(2/3)\cos 2\pi\sigma_0(\Delta-\Delta 0)]$ --.

Column 6, line 50, "polarizer" should be
-- polarizers --.

Signed and Sealed this

Sixteenth Day of November, 1993

Attest:

BRUCE LEHMAN

Attesting Officer

Commissioner of Patents and Trademarks